United States Patent [19]
Janowiak et al.

[11] Patent Number: 5,656,188
[45] Date of Patent: Aug. 12, 1997

[54] STACKABLE SKILLET WITH EXTENDABLE SIDE AND ADJUSTABILITY FEATURES

[76] Inventors: Steven M. Janowiak, N. 89 W. 17599 St. Thomas St., Menomonee Falls, Wis. 50351; Jeffrey D. Valind, 1443 E. Paradise Dr., West Bend, Wis. 53095

[21] Appl. No.: 379,298

[22] Filed: Jan. 27, 1995

[51] Int. Cl.⁶ .................... H05B 3/68; A47J 27/13
[52] U.S. Cl. .................... 219/438; 219/454; 99/340
[58] Field of Search .................... 219/401, 429, 219/433, 436, 438, 454; 99/340, 450

[56] References Cited

U.S. PATENT DOCUMENTS

| | | |
|---|---|---|
| 3,179,277 | 4/1965 | Olson et al. . |
| 3,641,920 | 2/1972 | Kraft et al. ............ 99/340 |
| 3,641,926 | 2/1972 | Williams et al. . |
| 3,859,505 | 1/1975 | Herbrand et al. . |
| 4,106,486 | 8/1978 | Lee . |
| 4,317,017 | 2/1982 | Bowen . |
| 4,334,462 | 6/1982 | Hefling . |
| 4,428,281 | 1/1984 | Miller . |
| 4,446,776 | 5/1984 | Gelfman . |
| 4,476,848 | 10/1984 | Protas . |
| 4,495,860 | 1/1985 | Hitch et al. . |
| 4,528,975 | 7/1985 | Wang . |
| 4,539,455 | 9/1985 | Colato et al. . |
| 4,818,832 | 4/1989 | Fukumoto . |
| 4,920,251 | 4/1990 | Whitenack et al. ............ 219/401 |
| 4,962,697 | 10/1990 | Farrar ............ 99/340 |
| 5,148,737 | 9/1992 | Poulson . |
| 5,176,067 | 1/1993 | Higgins . |
| 5,275,094 | 1/1994 | Naft . |
| 5,438,916 | 8/1995 | Dornbush et al. ............ 99/450 |

OTHER PUBLICATIONS

Pages from Fingerhut Catalogs dated prior to Sep. 10, 1993.

*Primary Examiner*—Teresa J. Walberg
*Assistant Examiner*—J. Pelham

[57] ABSTRACT

The stackable skillet has an open ring which is removeably attached to the upper edge of the skillet to extend the skillet upwardly thereby creating a deeper cavity. Removable and pivotable support structures are attached to the open ring and support removable racks and a dish alternatively or in combination at various levels. The stackable skillet allows for layered cooking on up to four different levels at one time within the device.

9 Claims, 13 Drawing Sheets

5,656,188

STACKABLE SKILLET WITH EXTENDABLE SIDE AND ADJUSTABILITY FEATURES

FIELD OF THE INVENTION

This invention is related generally to skillets and, more particularly, to layered cooking devices.

BACKGROUND OF THE INVENTION

Layered cooking allows two or more courses of a meal to be cooked simultaneously in the same device. This can be very helpful, since only a single burner or skillet is required to cook an entire meal. This type of device thereby saves both cooking space and time in clean-up.

There are a number of examples of layered cooking devices in the patent literature. U.S. Pat. Nos. 3,641,926 (Williams et al.); 3,859,505 (Herbrand et al.); 4,528,975 (Wang); 4,334,462 (Hefling); and 4,495,860 (Hitch et al.) depict a few of these devices. Williams and Herbrand make use of perforated surfaces to allow the flow of heat from one cooking layer to another. Hitch and Hefling incorporate wire racks or grates to support food within free-standing cooking apparatus, thereby accommodating multiple-level cooking. Wang makes use of a wire rack with terraced risers to support several cooking receptacles at different levels within one utensil.

There are also devices in the prior art that allow the cooking of multiple food simultaneously, but in nonlayered fashion. For example, U.S. Pat. Nos. 5,148,737 (Poulson) and 5,275,094 (Naft) provide for direct proximity between each food container and the heat source by means of rotation or side-by-side design of food compartments.

The prior art also includes various patents for devices used as steamers. For example, U.S. Pat. No. 4,106,486 (Lee) incorporates a collapsible perforated basket for holding food and U.S. Pat. No. 4,317,017 (Bowen) makes use of apertures and slots to provide for the passage of steam from the heat source to the food compartment.

The prior art also includes patents for rack cooking designs. U.S. Pat. No. 4,539,455 (Colato et al.) incorporates a free-standing rack design with adjustable legs. U.S. Pat. No. 4,818,832 (Fukumoto) provides for rack adjustment level in a microwave oven through the use of multi-level supporting pieces.

Despite the various types of multi-level cookware devices in the prior art, all of them are somewhat limited in their flexibility. For example, many of these designs do not allow layered or nonlayered cooking at the user's option. In other words, the choice of layers and the size of food compartments are often not adjustable. Furthermore, in those designs where use or nonuse of layered cooking is optional, the layers can only be used at a fixed level. A design that allows greater space between layers at the user's option is desirable. Multiple combinations of possibilities to accommodate different types of cooking or foods are not generally available in a single cooking unit.

Yet another undesirable aspect of layered cooking devices in the prior art is that generally only one type of layer is possible. Most of these devices either incorporate perforations in a dish-like unit or the use of wire racks. In fact, since different types of foods are cooked better on one option or the other, it is preferable to have the choice of using either in the same device.

Still another shortcoming of known multiple food cooking devices is that the size of food compartments may not accommodate the size of a food which the user desires to cook. In this respect, layered cooking which allows the full size of the cooking surface to be used for each layer is preferable.

Most of the support structures of the prior art devices also do not accommodate multiple configurations of layered cooking. Such fixed configurations are not "user friendly" because they do not provide for multiple possibilities to accommodate the need for different food types. Furthermore, none of the devices of the prior art provide for easy disassembly and a pivotal support system which may be collapsed and removed for easy storage or nonuse.

An improved stackable skillet overcoming some of the problems and disadvantages of the prior art by allowing multi-level cooking in an easily adjustable device having collapsible and removable support structure would be an important advance in the art. Furthermore, a multi-level cooking system by which the sides of the device are extended to allow for a deeper cooking compartment is an important advance in the art. Additionally, it is an important advance in the art to have a multi-level cooking device with many possible configurations which are readily adaptable to the user's particular cooking needs at any given time.

OBJECTS OF THE INVENTION

It is an object of this invention to provide an improved multi-layered skillet overcoming problems in the prior art, including those mentioned above.

Another object of this invention is to provide an improved multi-layered skillet which is easily assembled.

Another object of this invention is to provide an improved multi-layered skillet which is easily disassembled for use in cooking in a single layer or for storage when not in use.

Yet another object of this invention is to provide an improved multi-layered skillet which can be assembled and reassembled in various configurations depending upon particular cooking needs at any given time.

Another object of this invention is to provide an improved multi-layered skillet which can accommodate various racks or perforated dishes at different levels.

Still another object of this invention is to provide pivotal support structures which can collapse and be removed for ease in storage.

Another object of this invention is to provide a multi-layered skillet where several layers of food can be cooked simultaneously at various levels at the same time on one heat source.

Yet another object of this invention is to provide an improved multi-layered skillet where additional height to the skillet is created by the use of an open ring.

These and other important objects of the invention will become more apparent from the following descriptions and from the drawings.

SUMMARY OF THE INVENTION

The invention involves a skillet of the type having a base which has a bottom surface and at least one side surface which together define a cavity having an upper edge. An open ring is removably attached to the upper edge to extend the skillet upwardly. In the improvement, at least one support structure is attached to the open ring. The support structure is pivotable around a substantially horizontal axis and is also removable. The support structure can support at least one removable rack on which food can be cooked at various levels.

Alternatively, or in combination with the racks, the support structure can support a dish of a size and shape to fit within the open ring. Consequently, the support structure can simultaneously support two racks and a dish of a size and shape to fit within the open ring at different levels.

The open ring has a bottom edge and a top edge, the bottom edge being of a size and shape to attach to the upper edge of the base. The skillet may also have a cover of a size and shape to fit the upper edge of the base and the top edge of the open ring. The skillet may or may not be electric. Ideally, the open ring has at least one handle and has a lip around the bottom edge projecting inwardly. The lip of the open ring is of a size and shape to support the rack or the dish. The dish used for layered cooking in the skillet is ideally perforated and has at least one handle.

The racks in the skillet are comprised of a series of vertical and horizontal bars that define openings and the support structures support the racks by projecting a portion of their structure through the rack openings when the support structures are in a vertical position and the racks are in a horizontal position.

This arrangement allows the racks to be supported at different levels on the support structure and the lip of the open ring and allows for alternative support of the dish by the racks, the support structure or the lip of the open ring.

Further details of the new layered cooking device are set forth in the following detailed description and in the drawings.

DETAILED DESCRIPTION OF PREFERRED EMBODIMENTS

Figure 1:
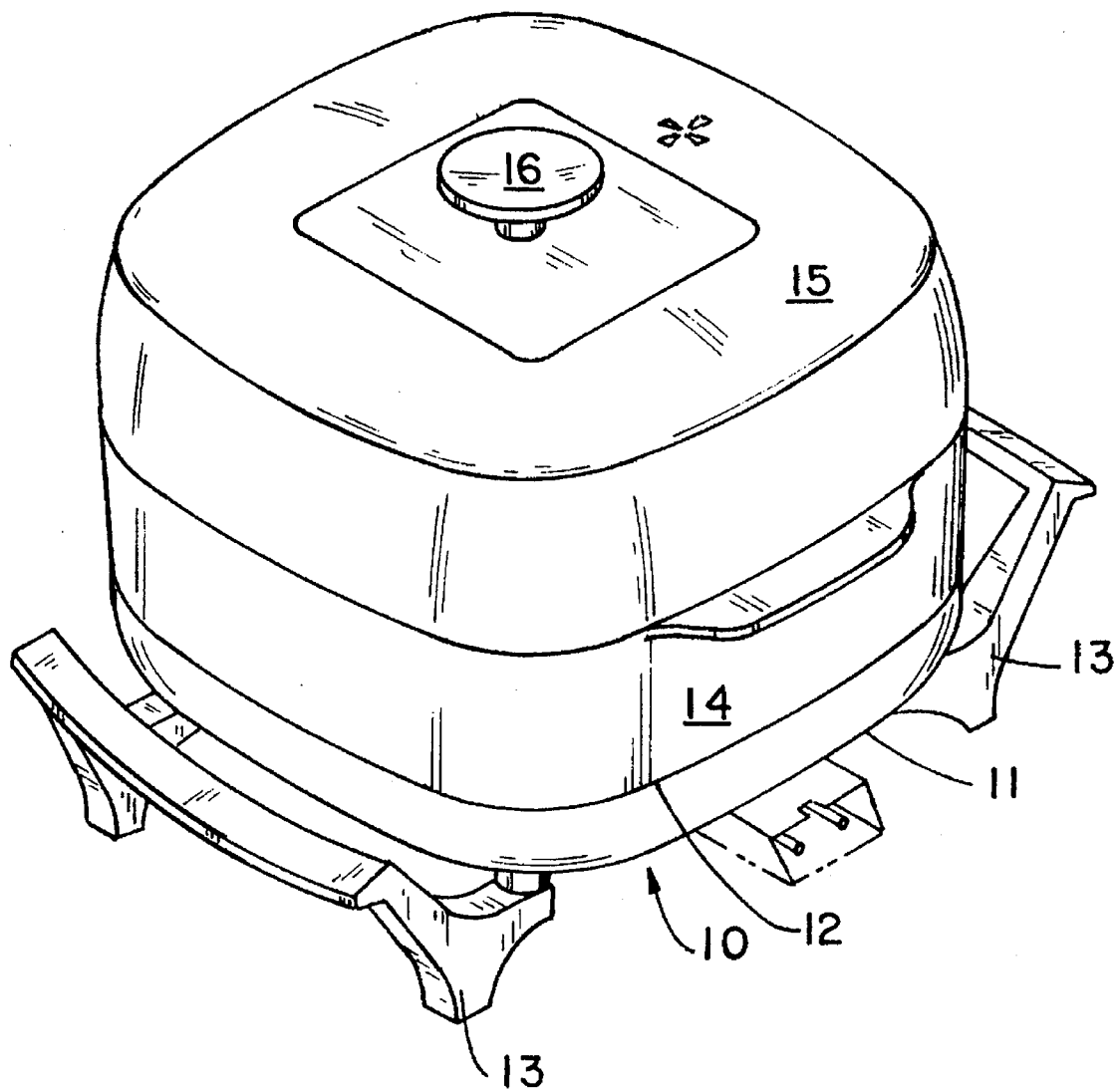
FIG. 1 is a perspective view of the new stackable skillet, showing electrical connector in phantom lines.

Referring to FIG. 1, the new stackable skillet 10 has a base 11, an upper edge 12 and base handles 13 that mount onto the base 11 to provide support to the skillet 10, as well as a gripping surface. As shown in FIG. 1, the preferred embodiment is electric. However, the skillet 10 may also be nonelectric, possibly with an alternate handle structure, to be used on a stovetop or burner.

Figure 5:
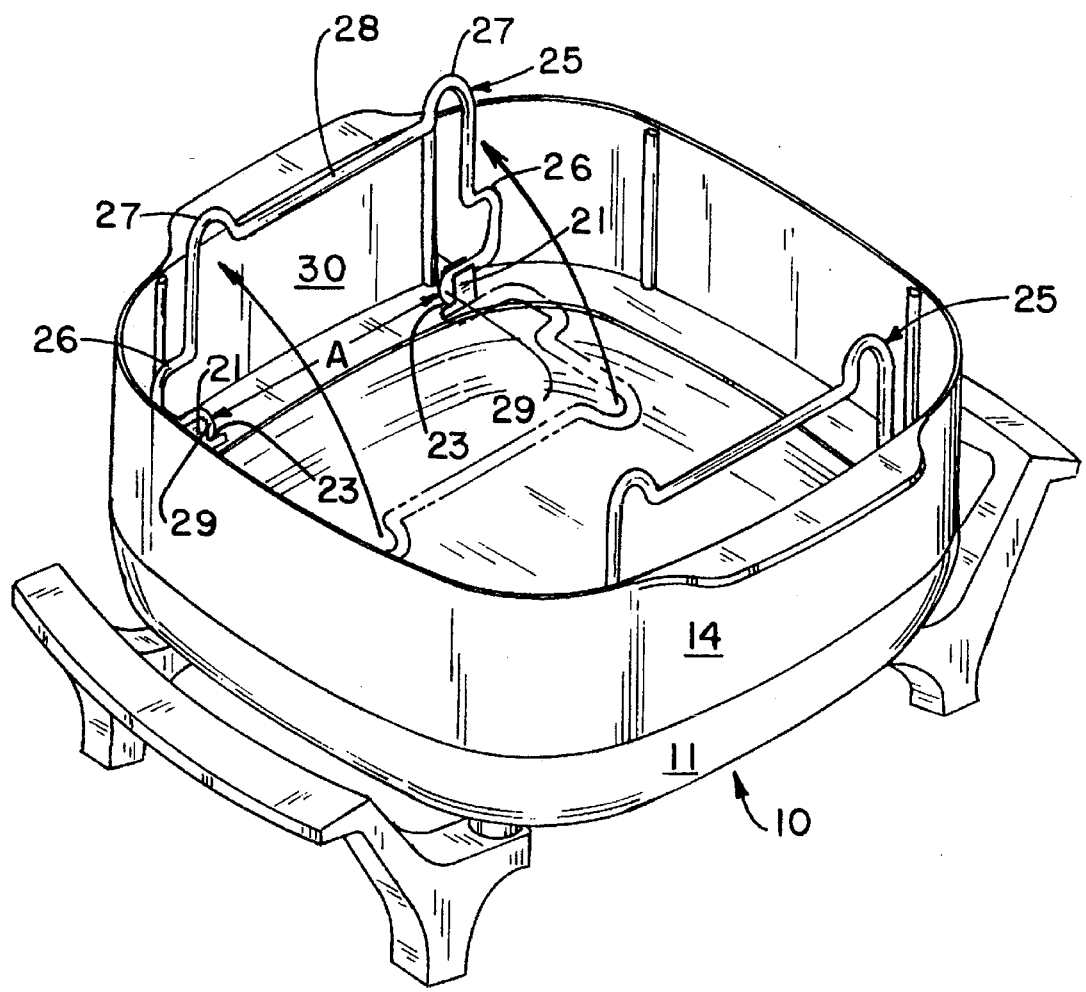
FIG. 5 is a perspective view of the stackable skillet, showing the open ring attached to the base; the support structures attached to the open ring; and the pivotal nature of the support structures in phantom lines.

As demonstrated by FIGS. 1 and 5, an open ring 14 removably attaches to the base 11 in such a fashion as to extend the skillet 10 upwardly, thereby increasing the depth of the skillet 10. A cover 15 is removeably attached to the open ring 14. Ideally, the cover 15 has a cover handle 16 to provide for easy removal of the cover 15 when desired.

Figure 2:
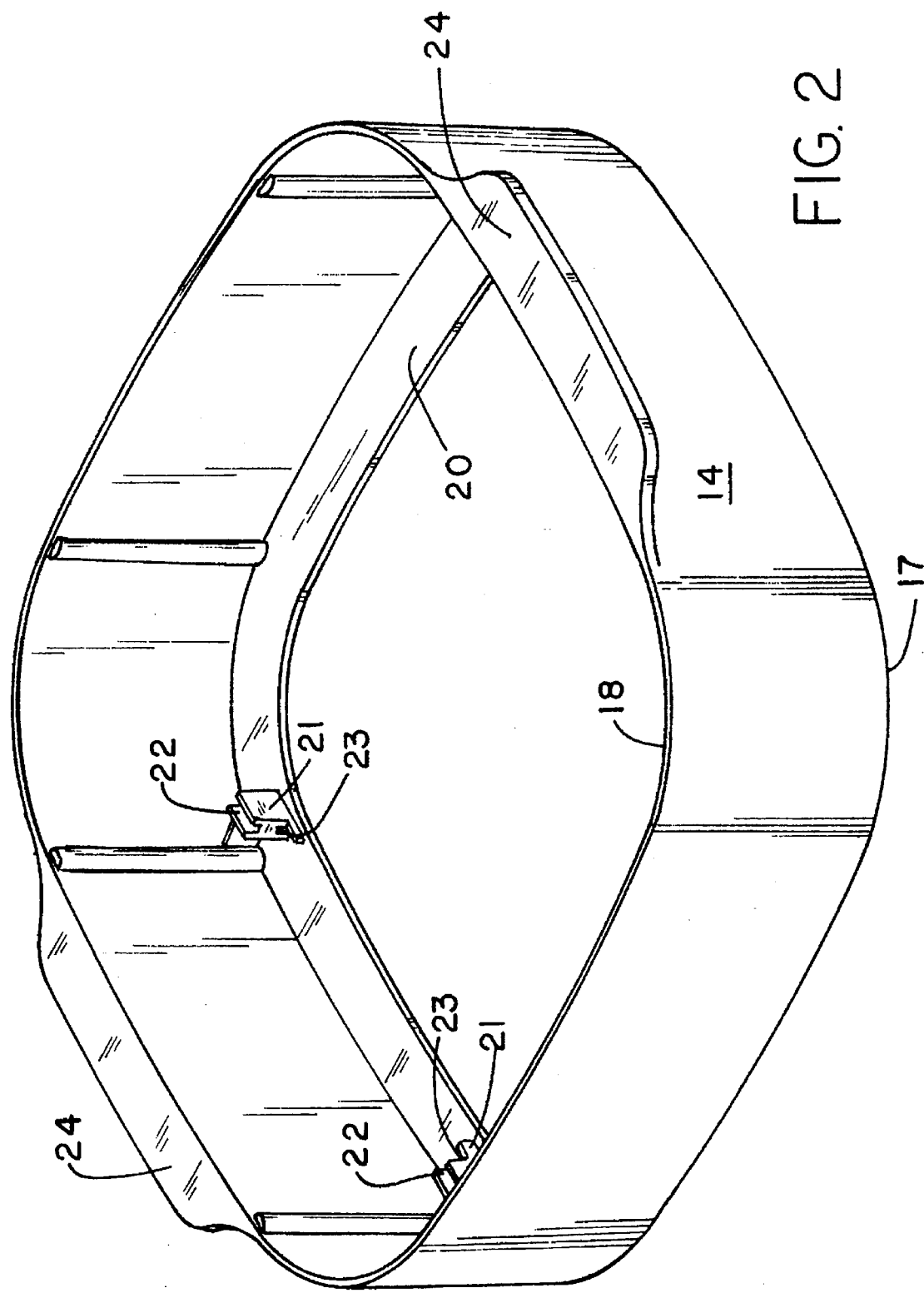
FIG. 2 is a perspective view of the open ring.

The open ring 14, as shown in FIG. 2, has a bottom edge 17 and a top edge 18. Ideally, the circumference and shape of the top edge 18 approximates the upper edge 12 of the base 11 in such a manner that the cover 15 will fit securely on both the upper edge 12 of base 11 or the top edge 18 of the open ring 14. The bottom edge 17 is of a size and shape to removeably attach to the upper edge 12 of the base 11. By attaching the open ring 14 to the base 11, the skillet 10 is given a deeper cooking cavity and access is maintained to the cooking surface of the base 11.

Figure 3:
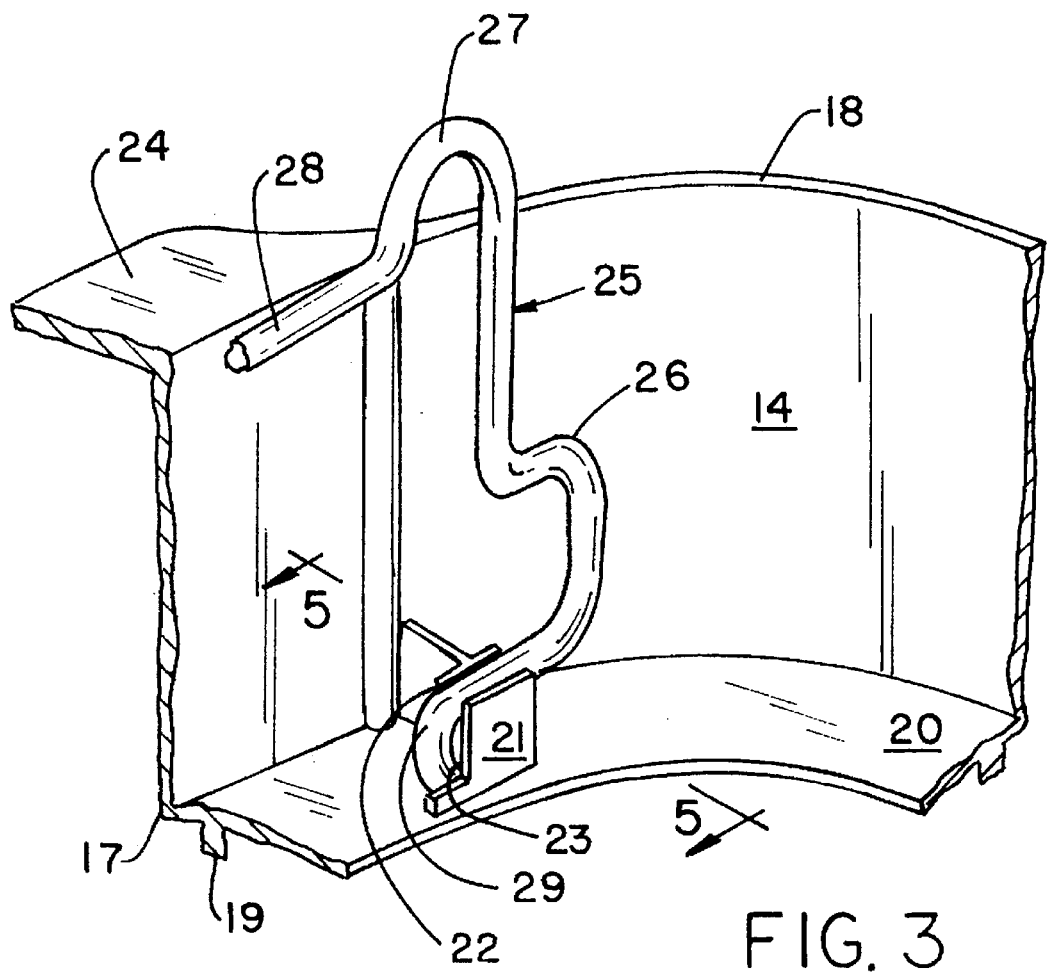
FIG. 3 is a perspective section view of a support structure attached to the open ring.
Figure 4:
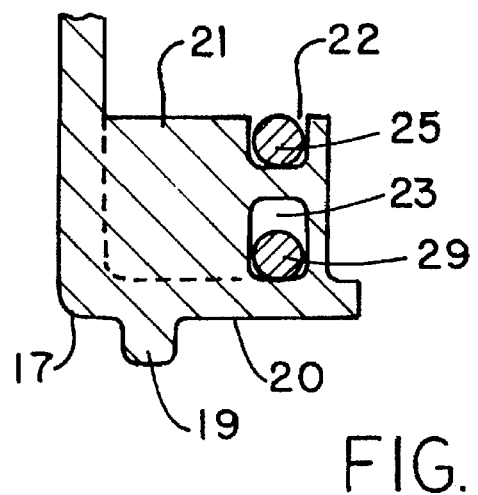
FIG. 4 is a cross section view of the support structure attached to the open ring of FIG. 3 taken along the viewing plane 5—5 thereof.

As shown in FIGS. 2, 3 and 4, in the preferred embodiment, the bottom edge 17 of the open ring 14 has a rim 19 and lip 20. The rim 19 is of a size and shape to approximate the size and shape of the upper edge 12 of the base 11, bat to fit securely within the upper edge 12 when placed on top of the base 11. In this way, the open ring 14 sits securely on top of the base 11 and is held in place by gravity, but the open ring 14 may easily be removed from the base 11 when use is not desired.

The lip 20 of the bottom edge 17 projects inwardly toward the center of the open ring 14 and may be used for purposes of support. In the preferred embodiment, there are four support rests 21. The support rests 21 are situated on the lip 20 of the open ring 14. In the preferred embodiment, two support rests 21 face an identical pair of support rests situated directly across from the first support rests 21 on the lip 20 of the open ring 14. As shown in FIGS. 2, 3 and 4, each support rest 21 has a grooved top 22 and a hole 23 in the side of the support rest 21. Each hole 23 faces the next closest support rest 21.

The open ring 14 has two handles 24 in the preferred embodiment. The handles are ideally situated on opposite sides of the open ring 14 at the top edge 18 of the open ring 14 and close to the support rests 21.

The preferred embodiment has two support structures 25, which, when attached to the open ring 14, are situated opposite one another in the support rests 21 on the lip 20 of the open ring 14. In the preferred embodiment, the support structures 25 are steel wires, configured in the manner shown in FIGS. 3 and 5, with a slightly wider dimension than the closest distance "A" between any two support rests 21. Each support structure 25 has shoulders 26, fingers 27, a support bar 28 and ends 29 in the manner shown. However, other configurations are possible which could achieve the same result.

The holes 23 are longer than they are wide, being of sufficient width to accommodate the ends 29 of the support structures 25, but long enough to allow the support structures 25 to be lifted above the grooved tops 22 of the support rests 21 if so desired.

The support structure 25 attaches to the open ring 14 by inserting one end 29 of a support structure 25 into the hole 23 in a support rest 21 and the other end 29 of the same support structure 25 in the hole 23 of the closest support rest 21. By squeezing the shoulders 26 of the support structure 25 together, insertion into the holes 23 of the support rests 21 is possible and the support structure 25 thereby locks into place within the holes 23 of the support rests 21.

As shown in FIG. 5, the support structure 25 can pivot upwardly toward the side 30 of the open ring 14. If downward pressure is applied to the support structure 25 when it is situated in a vertical position directly above the grooved tops 22 of the support rests 21, the support structure 25 will be held in place in the upright position by the grooved tops 22.

When it is desirable to pivot the support structures 25 downwardly, one may do so by pulling upwardly on the support structure 25 so that the support structure 25 is no longer held in a vertical position by the grooved tops 22. It can then be rotated downwardly, which can provide support for layered cooking in an alternative fashion or to facilitate storage. By squeezing together the shoulders 26 of support structure 25 when the support structure 25 is in either an upright or rotated position, the ends 29 of the support structure 25 can be removed from the holes 23 in the support rests 21 at the user's option. The second support structure 25, as shown in FIG. 5, is attached to the open ring 14 in a similar fashion.

Figure 6:
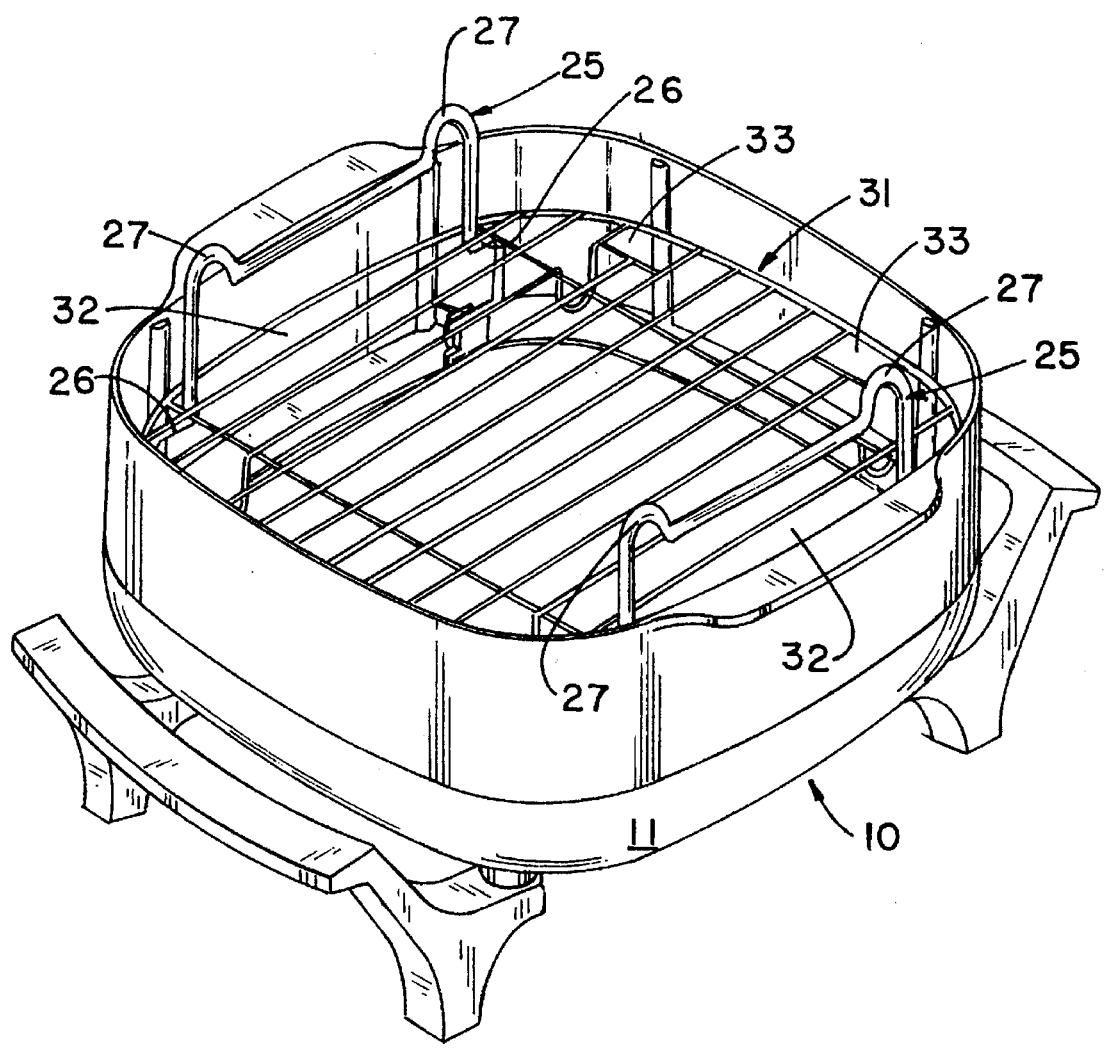
FIG. 6 is a perspective view of the stackable skillet showing a configuration using a single rack on the support structures attached to the opening ring.
Figure 7:
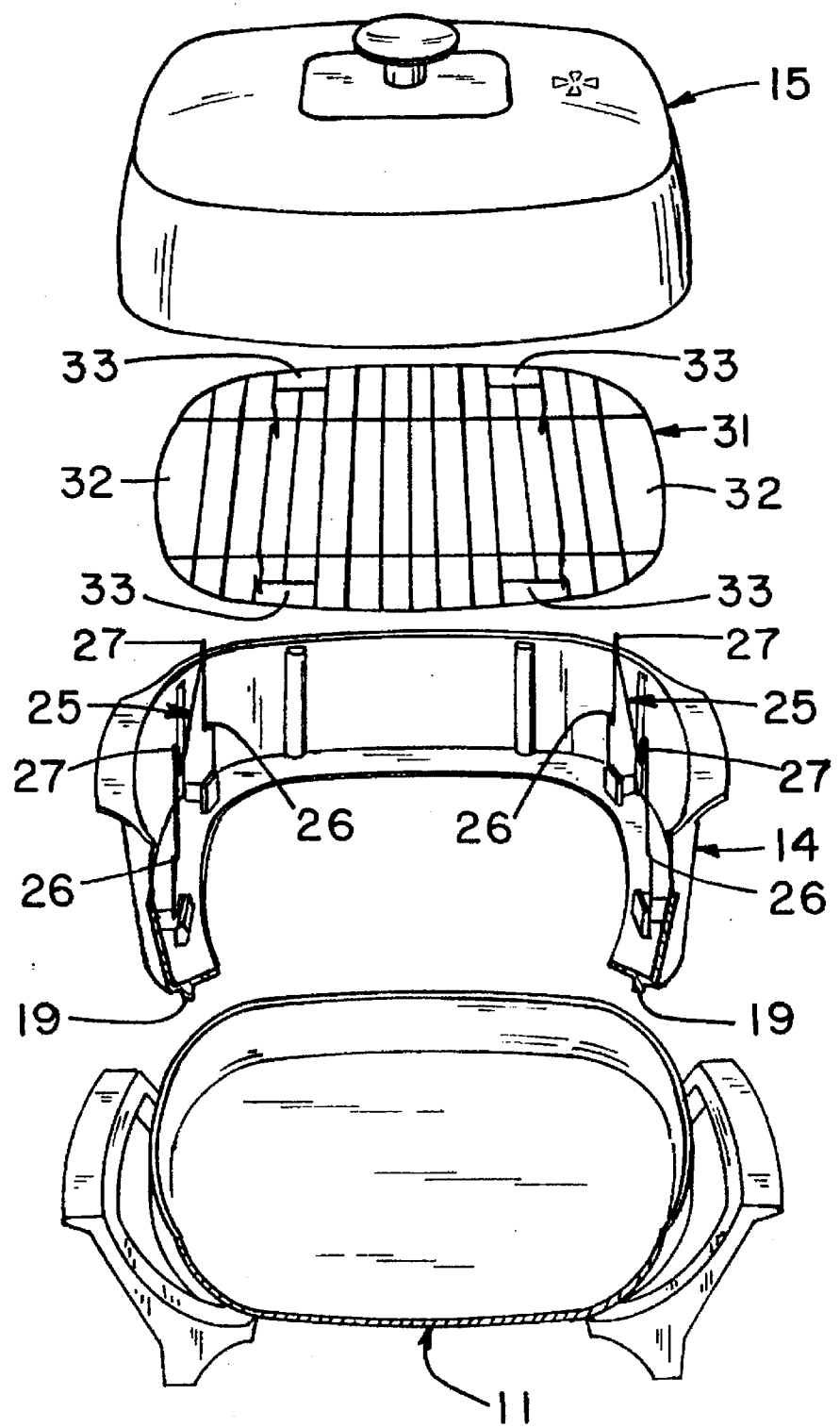
FIG. 7 is an exploded section view of the stackable skillet configuration shown in FIG. 6, with the cover also shown.

When the support structures 25 are in upright and locked position, they can provide support for a wire rack 31 as shown in FIGS. 6 and 7. The wire rack 31 is made up of a series of mutually perpendicular wire bars in the configuration shown in the drawings having two elongated openings 32 and four shorter rectangular openings 33. In FIG. 6, the wire rack is held in place on the support structure 25 by inserting the fingers 27 of the support structure 25 through the elongated openings 32 of the wire rack 31. In this way, the wire rack 31 rests on the shoulders 26 of the support structures 25 which provides a cooking surface above the base 11 of the skillet 10.

FIG. 7 demonstrates how the device shown in FIG. 6 is assembled. The open ring 14 with support structures 25 in upright and locked position is placed onto the base 11. The rim 19 of the open ring 14 keeps the open ring 14 in position on the base 11. A wire rack 31 is then placed on top of the open ring 14 by inserting the support structures 25 through the elongated openings 32, so that the wire rack 31 rests on the shoulders 26 of the support structures 25. The cover 15 can then fit securely on top of the open ring 14.

Figure 8:
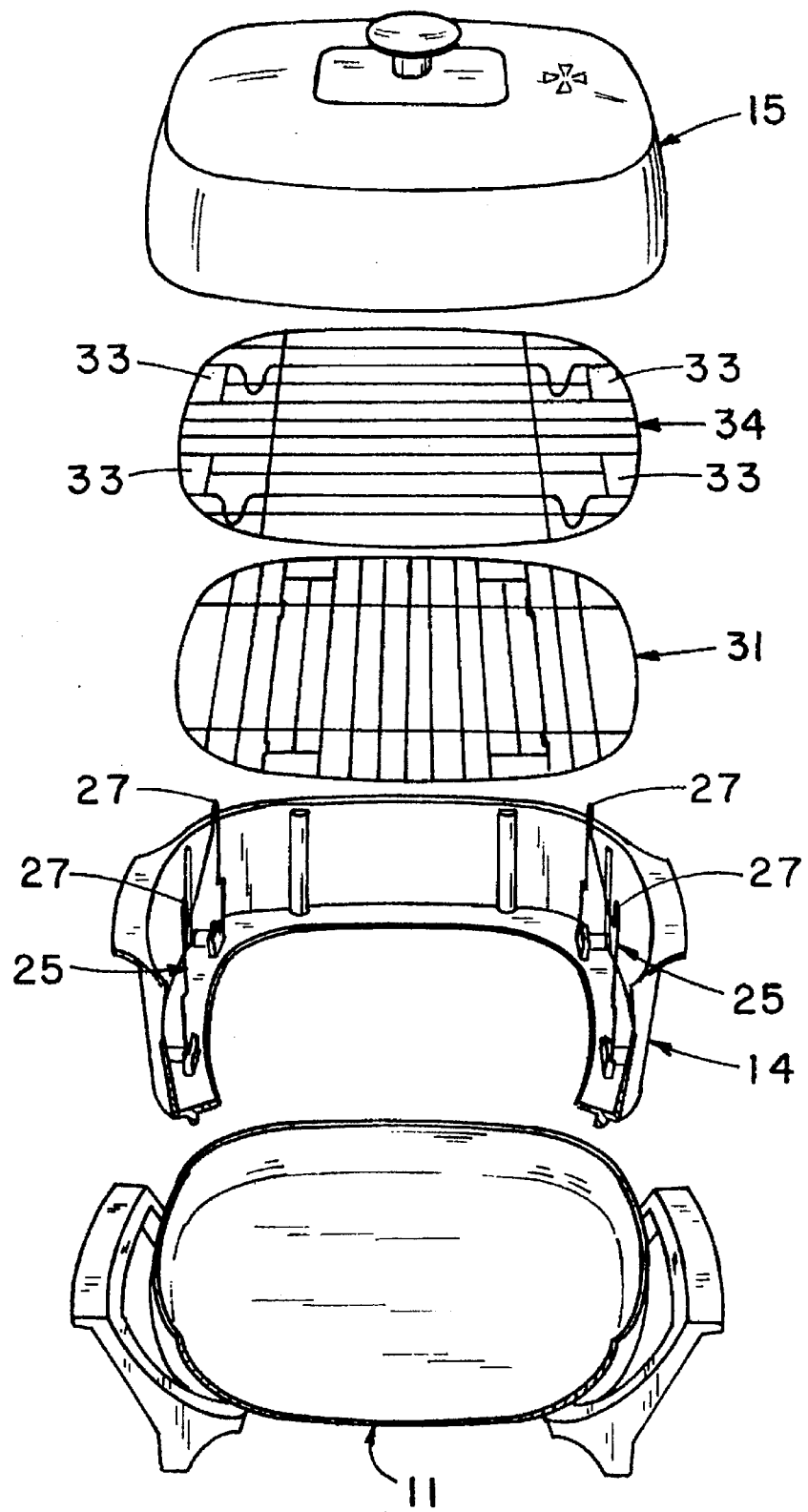
FIG. 8 is an exploded section view of another stackable skillet configuration, showing the base, open ring with support structures, two racks and cover.

FIGS. 8 through 14, while not exhaustive of the possibilities, demonstrate several of the possibilities of configurations of multi-layered cooking with the skillet 10. FIG. 8 demonstrates the use of the fingers 27 of the support structures 25 to support a second wire rack 34. The second wire rack 34 is identical in size and shape to the wire rack 31, but is supported at a different level by inserting the fingers 27 of the support structures 25 through the shorter rectangular openings 33 in the second wire rack 34. In this manner, three layers of cooking are achieved.

Figure 9:
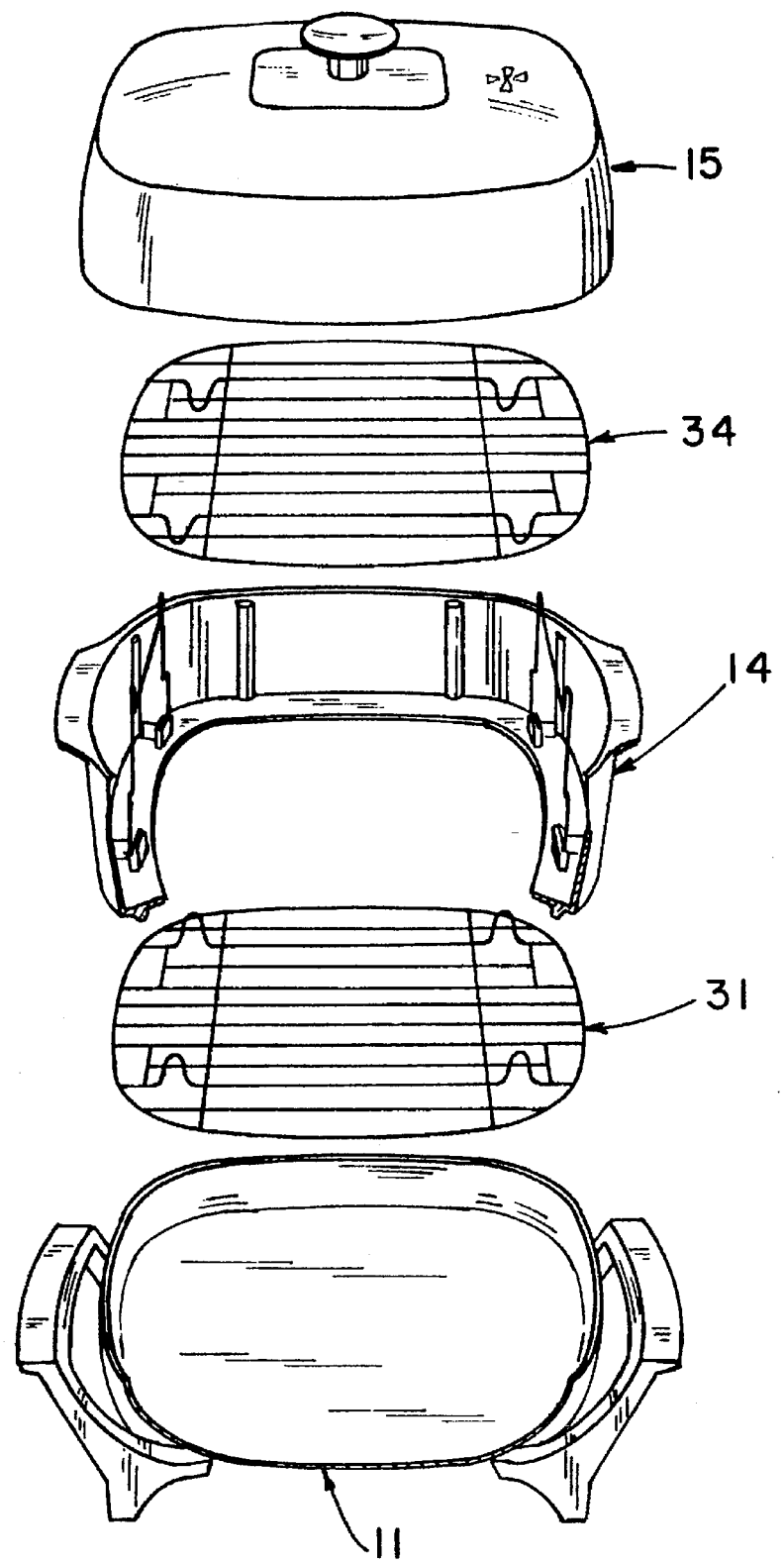
FIG. 9 is an exploded section view of yet another stackable skillet configuration showing the base, rack, open ring with support structures, rack and cover.
Figure 10:
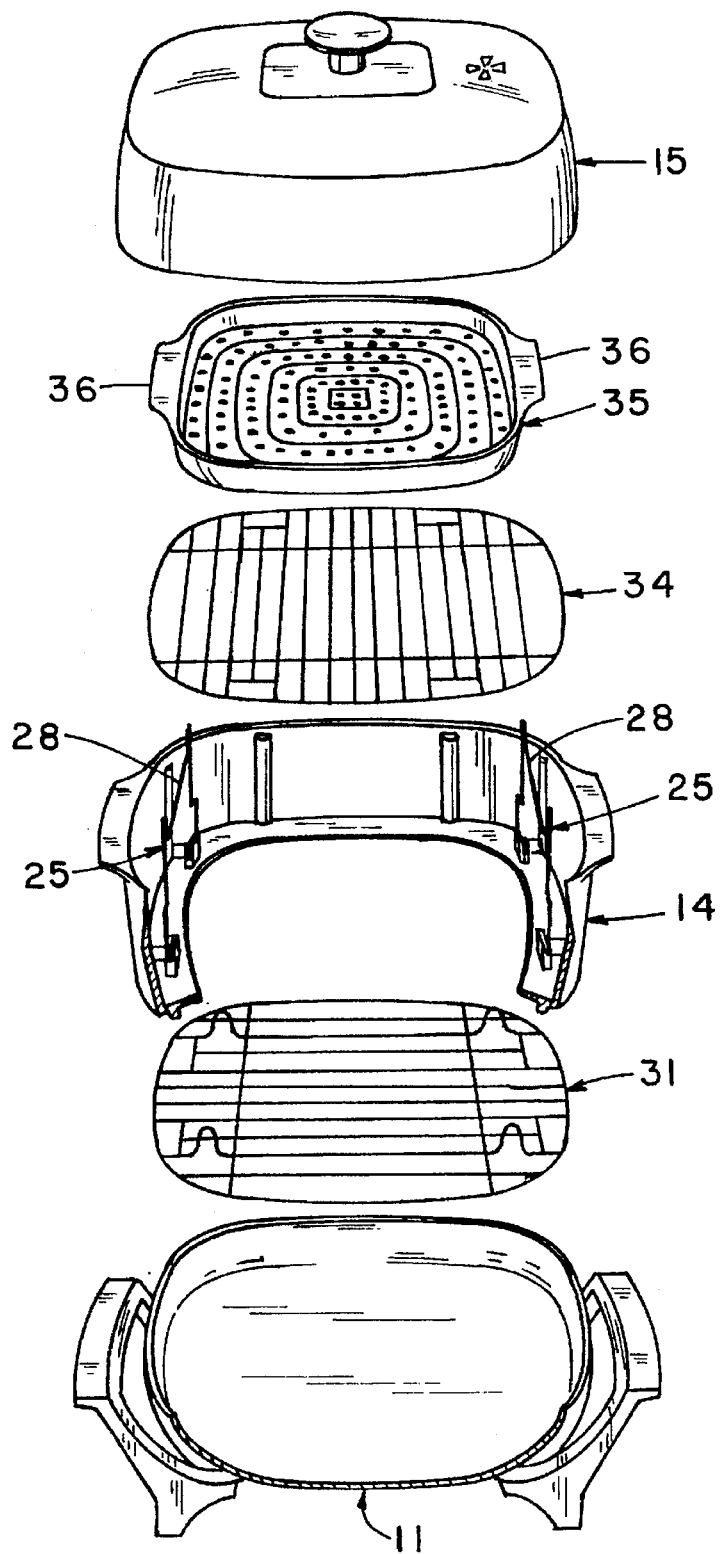
FIG. 10 is an exploded section view of still another stackable skillet configuration showing the base, rack, open ring with support structures, rack, dish and cover.
Figure 11:
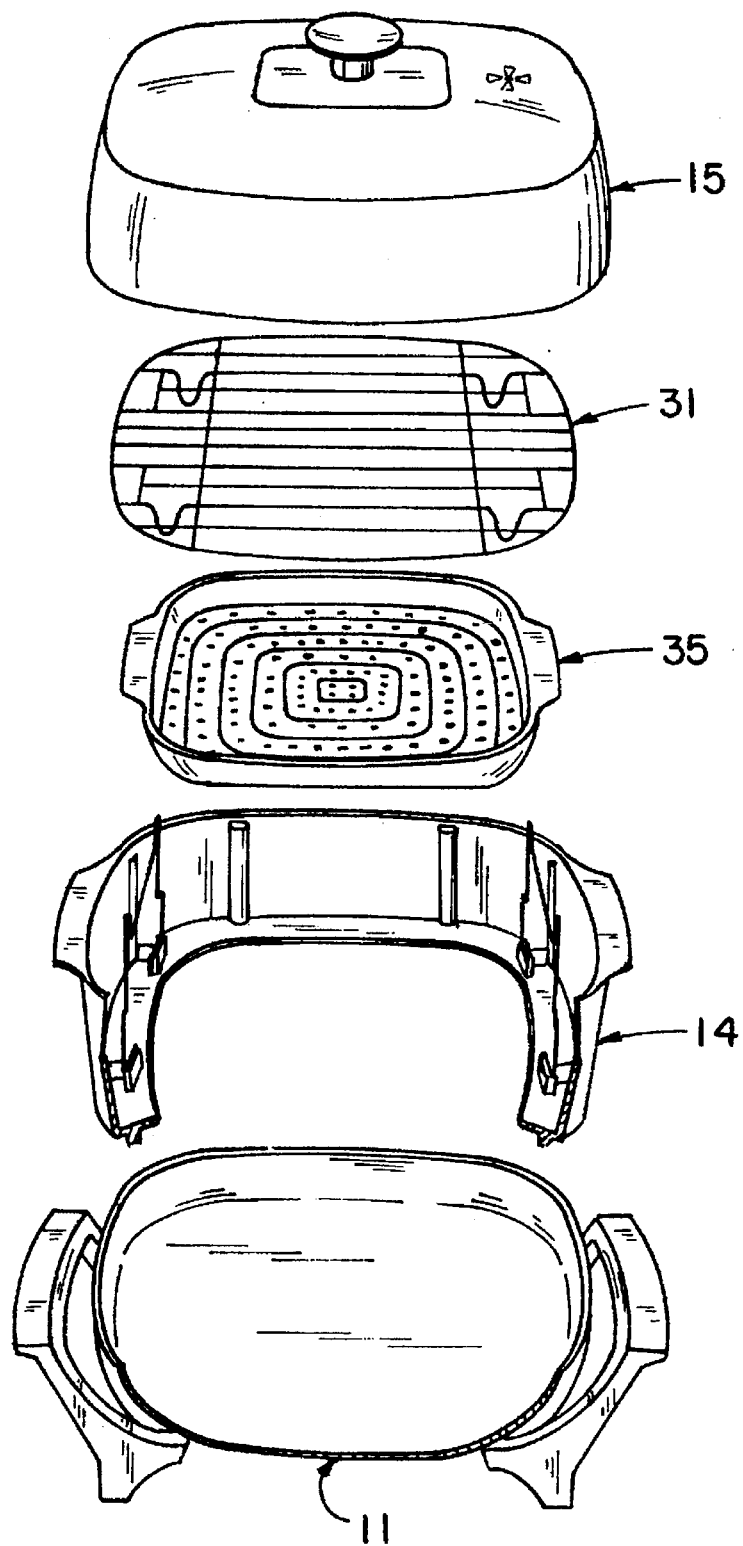
FIG. 11 is an exploded section view of another stackable skillet configuration showing the base, open ring with support structures, dish, rack and cover.
Figure 12:
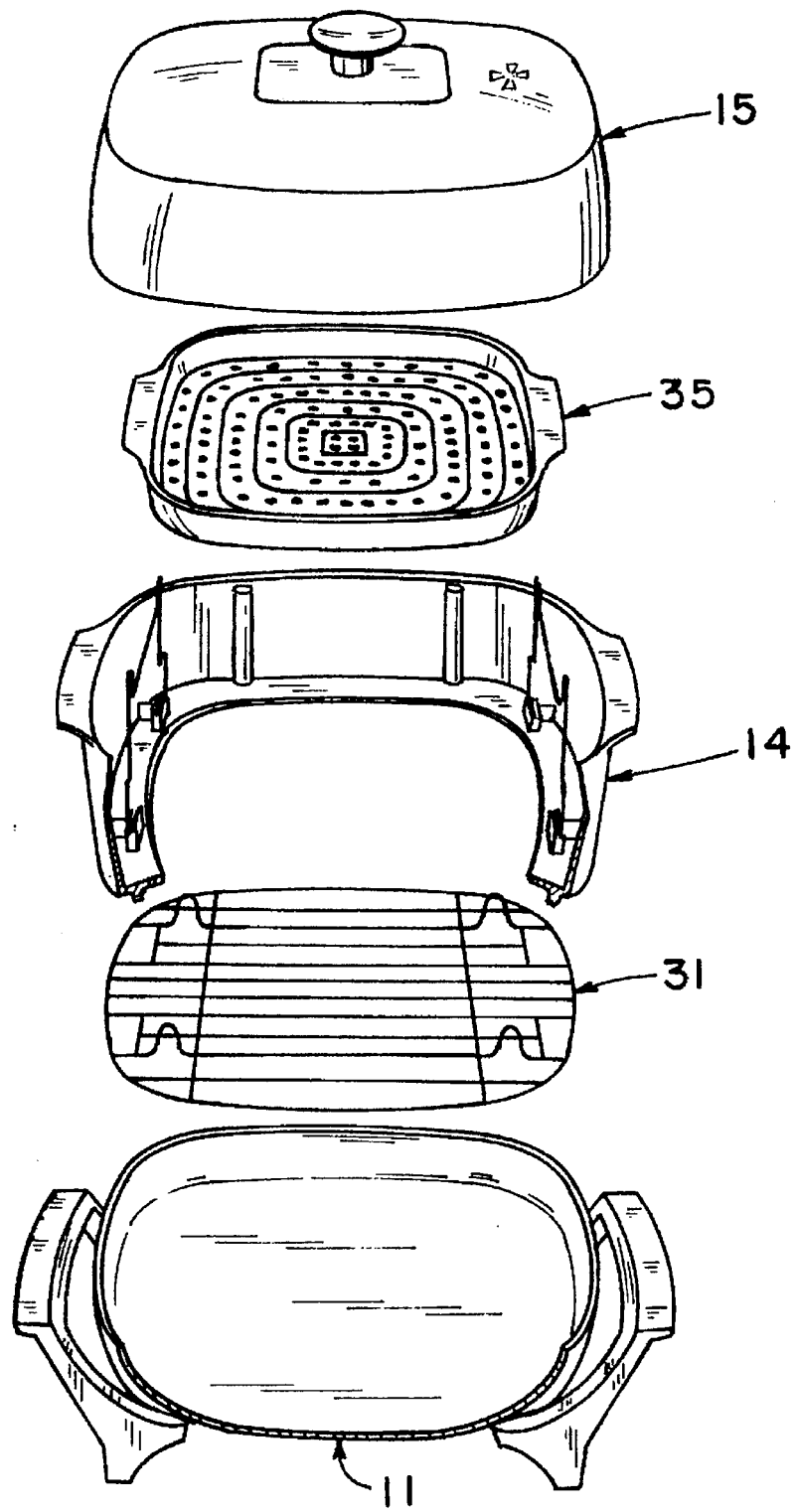
FIG. 12 is an exploded section view of yet another stackable skillet configuration showing the base, rack, open ring with support structures, dish and cover.
Figure 13:
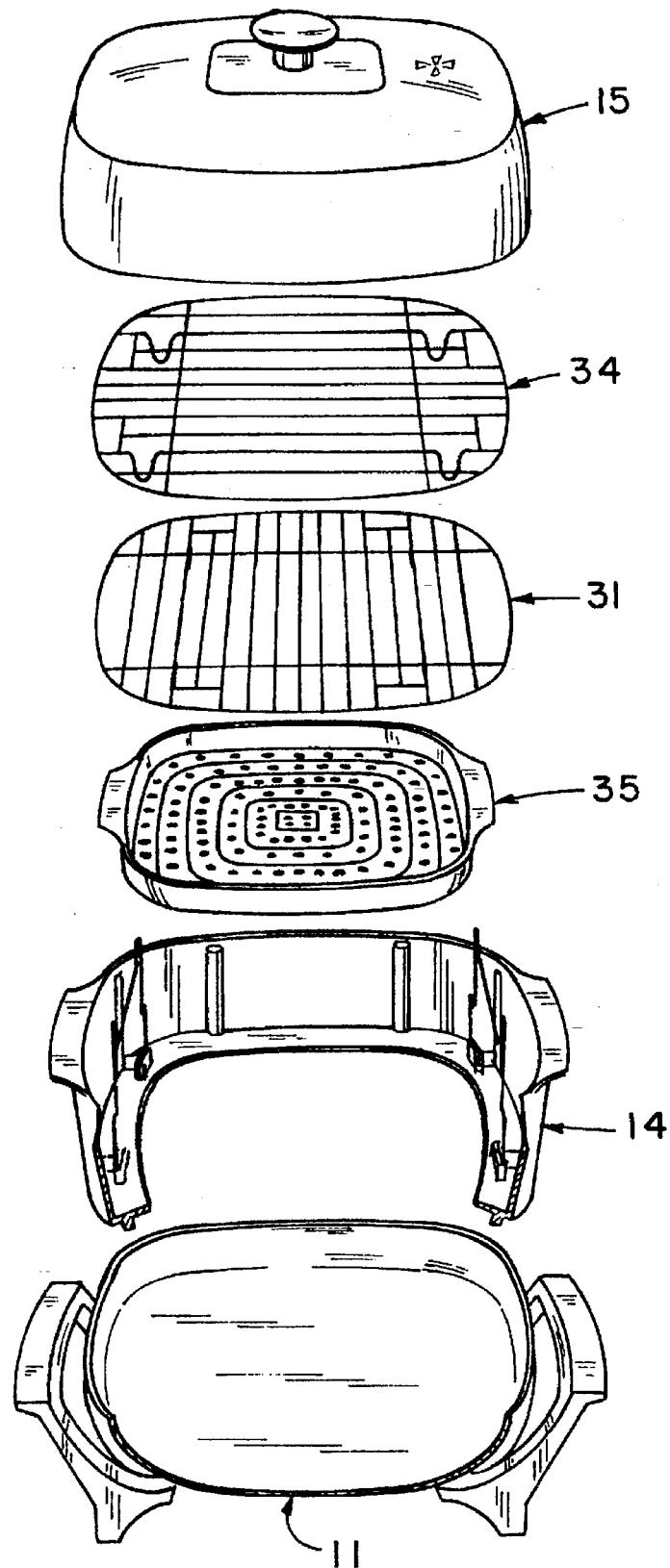
FIG. 13 is an exploded section view of still another stackable skillet configuration showing the base, open ring with support structures, dish, two rack and cover.
Figure 14:
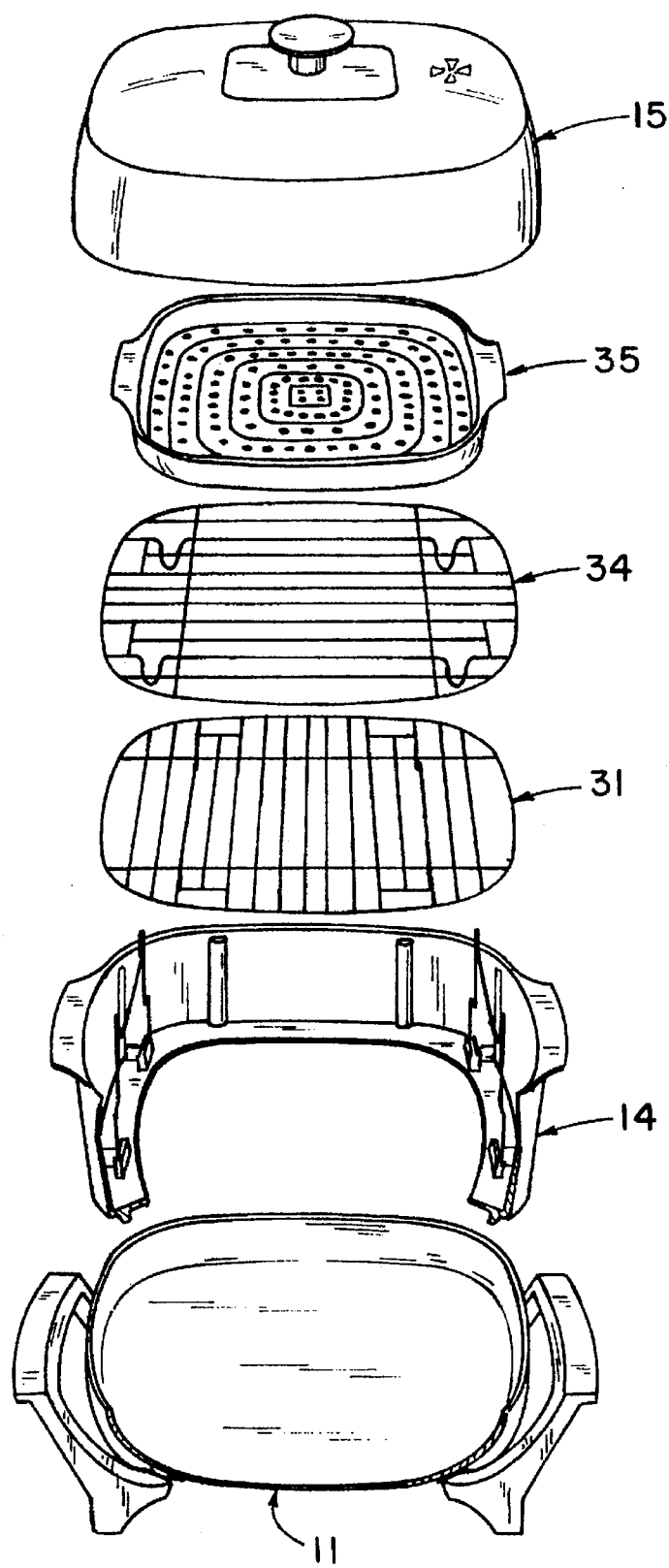
FIG. 14 is an exploded section view of another stackable skillet configuration showing the base, open ring with support structures, two racks, dish and cover.

FIG. 9 demonstrates another configuration with the use of two wire racks 31 and 34 with the skillet 10 where one wire rack 31 is placed below the open ring 14.

FIGS. 10 through 14 show various configurations that incorporate the use of a dish 35. The dish 35, in the preferred embodiment, is of the same general overall shape as the open ring 14, but is of smaller dimension so that it may be supported on the support bars 28 of the support structures 25 by dish handles 36 and fit within the skillet 10 when the cover 15 is in place on the device.

The dish 35 is ideally perforated to allow heat to freely flow from the base 11 to the cooking surface of the dish 35. The various configurations of the skillet 10, as shown by FIGS. 10 through 14, allow for various types of rack and dish combinations, thereby providing versatility in cooking surfaces at various levels depending upon the user's needs.

While the principles of this invention have been described in connection with a few specific embodiments, it is to be clearly understood that these descriptions are made only by way of example and are not intended to limit the scope of the invention.

What is claimed is:

1. A skillet of the type including a base having a bottom heated surface and at least one side surface which together define a cavity having an upper edge, the improvement wherein:

a rigid, one-piece open ring is removably attached to and supported by the upper edge to extend the skillet upwardly; and at least one support structure is removably attached to and supported by the ring;

the ring has a bottom edge;

such structure supports a cooking surface with respect to such bottom edge and above the heated surface; and the support structure is pivotable about a substantially horizontal axis.

2. The skillet of claim 2 wherein the cooking surface includes at least one removable rack and the support structure protrudes upwardly through the rack.

3. The skillet of claim 2 wherein the support structure is supported substantially vertically by the ring and includes a support bar and a shoulder which are at differing elevations when the structure is vertical, the support structure thereby being configured to support at least one rack at either of such elevations.

4. The skillet of claim 1 including a dish having a pair of handles and wherein the support structure includes two pairs of upwardly-extending fingers, the fingers of each pair being spaced apart by a dimension to laterally restrain a respective one of the handles, thereby supporting the dish with respect to the open ring.

5. The skillet of claim 1 wherein:

the support structure is supported by the ring and includes a support bar and a shoulder which are at differing elevations;

the skillet includes first and second racks, the first rack being supported by the support bar, the second rack being supported by the shoulder.

6. The skillet of claim 1 wherein the open ring has an inwardly-projecting lip around the bottom edge; and the support structure is attached to the lip, whereby such lip supports the cooking surface above such lip.

7. The skillet of claim 2 wherein:

the support structure is pivotable between a horizontal position and a vertical position;

the support structure is vertical;

the rack is horizontal and has a plurality of openings therethrough;

the support structure includes at least one finger protruding upwardly through one of the openings, the support structure thereby retaining the rack.

8. The skillet of claim 7 including a pair of racks supported at different levels on the support structure.

9. A skillet including a base having a bottom surface and at least one side surface which together define a cavity having an upper edge, the improvement wherein:

an open ring is removably attached to the upper edge to extend the skillet upwardly;

at least one support structure is attached to the open ring; and the support structure is removable from the ring and is pivotable about a substantially horizontal axis.

* * * * *

UNITED STATES PATENT AND TRADEMARK OFFICE
CERTIFICATE OF CORRECTION

PATENT NO. : 5,656,188
DATED : August 12, 1997
INVENTOR(S) : Steven M. Janowiak, et. al.

It is certified that error appears in the above-identified patent and that said Letters Patent is hereby corrected as shown below:

Column 6, line 33, after "claim", delete "2" and insert--"1"--.

Signed and Sealed this

Tenth Day of March, 1998

*Attest:*

BRUCE LEHMAN

*Attesting Officer*     *Commissioner of Patents and Trademarks*